US010891384B2

(12) United States Patent
van de Ruit et al.

(10) Patent No.: US 10,891,384 B2
(45) Date of Patent: Jan. 12, 2021

(54) BLOCKCHAIN TRANSACTION DEVICE AND METHOD

(71) Applicant: Koninklijke KPN N.V., Rotterdam (NL)

(72) Inventors: Douwe van de Ruit, The Hague (NL); Rinze Cats, The Hague (NL)

(73) Assignee: KONINKLIJKE KPN N.V., The Hague (NL)

( * ) Notice: Subject to any disclaimer, the term of this patent is extended or adjusted under 35 U.S.C. 154(b) by 186 days.

(21) Appl. No.: 15/897,080

(22) Filed: Feb. 14, 2018

(65) Prior Publication Data

US 2019/0121988 A1    Apr. 25, 2019

Related U.S. Application Data

(60) Provisional application No. 62/574,645, filed on Oct. 19, 2017.

(51) Int. Cl.
| | | |
|---|---|---|
| *H04L 9/32* | (2006.01) | |
| *G06F 21/60* | (2013.01) | |
| *G06Q 20/36* | (2012.01) | |
| *G06Q 20/38* | (2012.01) | |
| *G06Q 20/32* | (2012.01) | |
| *H04L 9/08* | (2006.01) | |

(52) U.S. Cl.
CPC ....... *G06F 21/602* (2013.01); *G06Q 20/3229* (2013.01); *G06Q 20/36* (2013.01); *G06Q 20/3825* (2013.01); *G06Q 20/3829* (2013.01); *H04L 9/0825* (2013.01); *H04L 9/0869* (2013.01); *H04L 9/0894* (2013.01); *H04L 9/3247* (2013.01); *G06Q 2220/00* (2013.01); *H04L 2209/38* (2013.01)

(58) Field of Classification Search
CPC .............. G06F 21/602; G06Q 20/3825; G06Q 20/3229; G06Q 20/3829; G06Q 20/36; G06Q 2220/00; H04L 9/3247; H04L 9/0894; H04L 9/0869; H04L 9/0825; H04L 2209/38
USPC ...................................................... 713/166
See application file for complete search history.

(56) References Cited

U.S. PATENT DOCUMENTS

| | | | |
|---|---|---|---|
| 2008/0189543 A1* | 8/2008 | Parkinson | G06F 21/33 713/156 |
| 2017/0031676 A1 | 2/2017 | Cecchetti et al. | |
| 2017/0236121 A1* | 8/2017 | Lyons | G06O 20/102 705/71 |
| 2017/0364911 A1* | 12/2017 | Landrok | G06Q 20/42 |
| 2018/0054463 A1* | 2/2018 | Chang | H04L 63/20 |
| 2018/0137272 A1* | 5/2018 | Kamal | H04W 4/80 |
| 2018/0165673 A1* | 6/2018 | Francis | G06F 21/57 |
| 2018/0262341 A1* | 9/2018 | Cheng | H04L 9/0877 |

\* cited by examiner

*Primary Examiner* — Michael S McNally
(74) *Attorney, Agent, or Firm* — Hamilton, Brook, Smith & Reynolds, P.C.

(57) ABSTRACT

Some embodiments relate to a blockchain transaction device arranged to generate a transaction for a blockchain. The blockchain transaction device is configured to generate a transaction, said transaction comprising a signature, by calling a signing interface of a cryptographic kernel application to obtain the signature for the transaction. The cryptographic kernel application is configured to access a high security data area and compute the signature from a private key.

13 Claims, 9 Drawing Sheets

BLOCKCHAIN TRANSACTION DEVICE AND METHOD

RELATED APPLICATION

This application claims the benefit of U.S. Provisional Application No. 62/574,645, filed on Oct. 19, 2017. The entire teachings of the above application are incorporated herein by reference.

TECHNICAL FIELD

The invention relates to a blockchain transaction device, a blockchain transaction method, and a computer readable medium.

BACKGROUND

Blockchains are a novel technology that allows distributed management of transactions while at the same time maintaining trust in those transactions. Moreover, the latter may also be done in a distributed manner. A blockchain comprises a list of records, which are called blocks, which are linked. Each block contains a pointer as a link to a previous block. Multiple parties can record transactions in the blockchain or verify previous transactions of others. The blockchain is sometimes referred to as a ledger.

An example of a known blockchain system is given in US Patent Application 20170031676, "Blockchain Computer Data Distribution" (included herein by reference). The known system discloses various uses of such blockchains. For example, blockchains are used in cryptocurrency systems. For example, cryptocurrency transactions for a period may be stored in a block that is then added to the tail of the blockchain, thereby extending the blockchain. The history of the cryptocurrency can be accessed by moving along the blocks of the blockchain. The blockchain could be held privately, e.g., in a centralized manner, or held publicly in a less centralized manner. The latter is usual for cryptocurrencies. Apart from cryptocurrencies, blockchain may be used to record a large variety of other transactions; ranging from distributed notaries to domain names.

In the past few years, the value of transactions recorded on blockchains have increased sharply. For example, the value of a bitcoin doubled over 2016, and increased fifteen-fold in 2017. As a result of this increase in value, bitcoins are an attractive target for hackers. Digital currency can be stolen without physical nearness, can be disposed of with relative high anonymity, and can give a large return.

Unfortunately, bitcoins are not so easy to protect. Typically, transactions on a blockchain are linked to private keys which are too long to remember. Moreover, the assets in a wallet may be linked to several of such private keys. The bitcoins may be encrypted, e.g., through passwords, but this requires hard-to-guess passwords. There is thus a need to improve the secure storage of digital assets.

SUMMARY

It would be advantageous to have an improved device to handle private keys. A blockchain transaction device is provided which is arranged to generate a transaction for a blockchain. The blockchain transaction device comprises
an electronic memory system comprising
a high security data area and a low security data area, the high security data area comprising data determining a private key of a public key and private key pair, and
a cryptographic kernel application and a transaction application, the cryptographic kernel application having access to the high security data area, the transaction application having access to the low security data area,
a processor circuit system configured to execute the cryptographic kernel application, and the transaction application, wherein
the transaction application is configured to generate a transaction, said transaction comprising a signature, the transaction application being configured to call a signing interface of the cryptographic kernel application to obtain the signature,
the cryptographic kernel application comprising the signing interface and is configured to access the high security data area and compute the signature from the private key,
a communication interface arranged to transmit the transaction for inclusion in the blockchain.

Because the handling of private keys is separated in a different application from the creation of the transaction, security is improved. The transaction application is generally more complicated software and more likely to be compromised than the cryptographic kernel. Moreover, because fewer requirements are placed on the cryptographic kernel, a higher level of security can be achieved, e.g., by using the security provisions of the device. For example, in an embodiment the high and low security data areas may be provided in different memories. Access to the high security data area may be more restricted, e.g. restricted to the cryptographic kernel application. Likewise, the transaction application and the cryptographic kernel application may be executed on different processor circuits. For example, the memory for the high security data area and the processor for the cryptographic kernel may be combined in a hardware element which may be releasably connected to the transaction device. In an advantageous embodiment, the hardware element is a SIM card, and the transaction application is implemented in a mobile phone in which the SIM card may be inserted. The private key stored in the high security data area may be in any representation, e.g., the private key may be encrypted or may be stored as a seed from which the private key may be computed. In particular, the high security data stores information enabling derivation of the private key. A seed is considered data determining a private key, as it is required for deriving the key notwithstanding that other data may be involved that may also determine the private key. Determining the private key from a seed and optional further data is deterministic.

For example, the hardware element may be a tamper-resistant platform capable of securely hosting applications and their confidential and/or cryptographic data. For example, this may be done in accordance with to some defined set of security requirements, e.g., set forth by some trusted authority. In an embodiment, the hardware element is a chip that offers a dynamic environment to store data securely, process data securely and perform communication with external entities securely. For example, the hardware element may be a one chip microcontroller. The hardware element may provide memory for the applications stored in it. Moreover, the hardware element may perform functions such as encrypt, decrypt and sign data.

The hardware element may be a so-called 'secure element'. Examples of a secure element in phones include the chip directly embedded into the phone's hardware, a SIM/UICC card provided by your network operator, and an SD card that can be inserted into the mobile phone.

In an embodiment, the cryptographic kernel is configured to generate keys. Generating keys is advantageously done in the cryptographic kernel as this avoids exporting the private key outside of the secure parts. As access to the private key is reduced so is the security increased. A private key may be generated from a seed, which may be stored in high security data area. Storing a key in the high security data area may comprise exporting key derivation data to the low security data area, and keeping the seed in the high security data area.

A further advantage of the cryptographic kernel, is that it may verify the transaction. For example, the cryptographic kernel may obtain information from the data to be signed, e.g., information that represents the transaction or part thereof, display it to the user before proceeding with the signing. The user may be asked for confirmation by the cryptographic kernel.

For example, the user may be asked for verification, during which the parameters of the transaction are displayed again. For example, suppose a user sets up a transaction like 'transfer 5 euros to Jan'. The user may then see this information again before signing. This prevents malicious software from changing the input parameters. Preferably, confirmation is obtained by the cryptographic kernel after importing the parameters into the cryptographic kernel and before signing. In addition, or alternatively, the transaction application may confirm what will be sent to the kernel and what it is going to sign, e.g., in a sim powered screen, which may be outside of the OS.

In an embodiment, the transaction application and the cryptographic kernel have a restore interface. The transaction application restore interface is configure to receive a seed, e.g., a root seed. For example, this may be received from an external computer, e.g., over a computer network. For example, this may be received from the user, e.g., in the form of a mnemonic seed. The cryptographic kernel's restore interface may receive the seed from the transaction application. The seed is then used to restore private keys that were generated from it. In addition to a restore interface, there may be also an export interface in the transaction application and cryptographic application to export a seed from the cryptographic kernel, through the transaction application to the user. For example, the seed may be generated in the cryptographic kernel. The seed may be exported as a mnemonic seed. Using these interfaces, it is possible to transfer a wallet, e.g., to another SIM.

In an embodiment, the cryptographic kernel is configured for generating and storing a root seed in the high secure data area, e.g., on the hardware element.

The blockchain transaction device is an electronic device. In particular, it may be a mobile electronic device, such as a mobile phone. The blockchain transaction device may be a computer.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a blockchain transaction device, FIG. 1b schematically shows an example of an embodiment of a blockchain transaction device, FIG. 1c schematically shows an example of an embodiment of a blockchain transaction device, FIG. 1d schematically shows an example of an embodiment of a blockchain transaction device, FIG. 2 schematically shows an example of an embodiment of a blockchain, FIG. 3 schematically shows an example of an embodiment of a blockchain transaction device, FIG. 4a schematically shows an example of an embodiment of a high and low security data area, FIG. 4b schematically shows an example of an embodiment of a high and low security data area, FIG. 4c schematically shows an example of an embodiment of a high and low security data area, FIG. 5 schematically shows an example of an embodiment of a blockchain transaction method, FIG. 6 schematically shows an example of an embodiment of a blockchain transaction method, FIG. 7a schematically shows a computer readable medium having a writable part comprising a computer program according to an embodiment, FIG. 7b schematically shows a representation of a processor system according to an embodiment.

LIST OF REFERENCE NUMERALS, IN FIGS. 1a-5

Figure 1A:
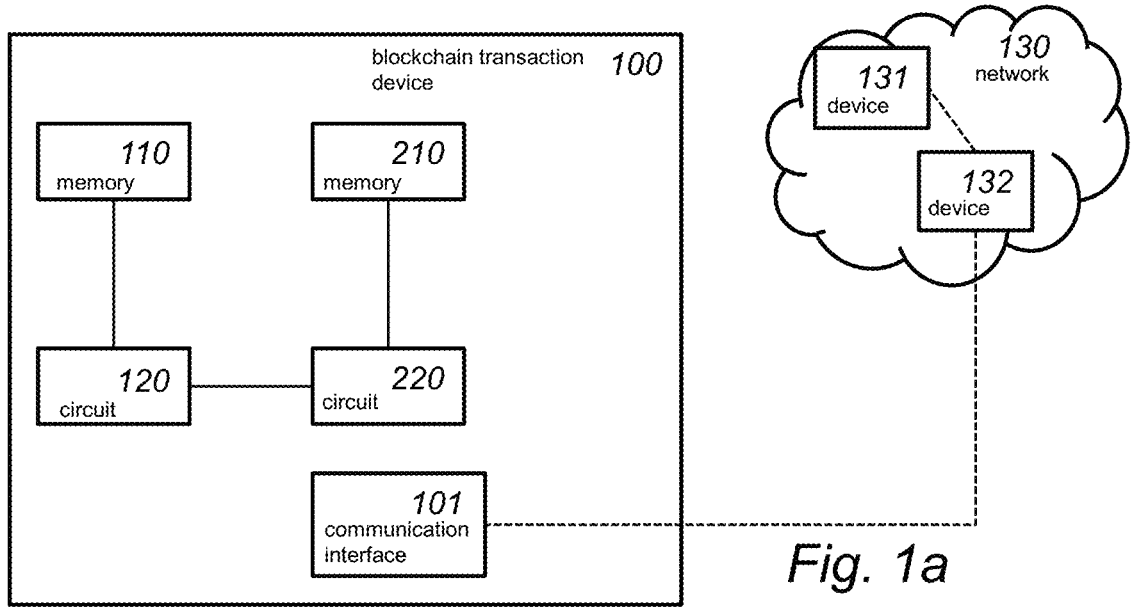

100 a blockchain transaction device
101 a communication interface
110 a low security memory
111 a memory
112 a low security data area
113 a low security mode
120 a low security processor circuit
121 a processor circuit
130 a blockchain peer to peer network
131 a first blockchain management device
132 a second blockchain management device
200 a hardware element
201 a SIM card
202 a phone
203 a SIM card circuit
210 a high security memory
212 a high security data area 213 a high security mode
220 a high security processor circuit
230 a blockchain
231-235 a block
300 a blockchain transaction device
310 a communication unit
320 a low security data area
327 a binding number
330 a transaction application
340 a transferring unit
350 a receiving unit
420 a high security data area
426 a seed
430 a cryptographic kernel application
440 a signing unit
441 a confirmation unit
442 a hash unit
450 a key generation unit
451 a creation unit
452 an export unit
460 an interface
321, 324 a public key
322, 325 a key pair index
323, 326 account data
421, 424 a private key
422, 425 a key pair index
428, 429 a derivation information
500 a mobile phone
510 a transaction application
520 a cryptographic kernel
530 a bitcoin network
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a blockchain transaction device 100. Blockchain transaction device 100 is arranged to generate a transaction for a blockchain. An example of a blockchain is blockchain 230, shown in FIG. 2.

Figure 2:
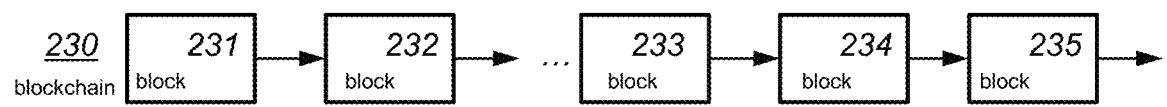

FIG. 2 schematically shows an example of an embodiment of a blockchain 230. Blockchain 230 comprises multiple blocks; shown are blocks 231, 232, 233, 234 and 235. The first block 231 is known as the genesis block. After the genesis block, each block refers back to the previous block in the chain. This is illustrated with arrows between the blocks. For example, block 232 refers back to block 231, block 234 refers back to block 233, and so on. Referring back can be done in a variety of ways, e.g., by including some part of the previous block, e.g., an identifier or its consensus proof, or a value computed over the previous block, e.g., a hash, a signature, etc.

A block may comprise one or more transactions. Some embodiments, may allow blocks with zero transactions, e.g., to support timely delivery of new blocks. The transactions may be transactions on cryptocurrency but this is not needed. The transactions may be registrations of transfers, e.g., of domain names. They may register data, e.g., sensor values. Typically, each of the blocks comprises a consensus proof. The consensus proofs are computed over the one or more transactions. New blocks are created by blockchain management devices, which may be connected in a peer to peer network. Various equivalent Cryptographically Secured Distributed Ledger technologies may be used such as: Blockchain, Hashgraph, Directed Acyclic Graph, etc., as such technologies support the same concepts: consensus algorithms, cryptocurrencies, tokens, etc.

Returning to FIG. 1a, such a peer to peer network 130 is shown. The network may comprise multiple blockchain management devices; shown are blockchain management device 131 and blockchain management device 132. The blockchain management devices in the network are connected, e.g., in a peer-to-peer fashion but it may also be in a different way, e.g., as an organized or hierarchical network, etc. Blockchain transaction device 100 comprises a communication interface 101 arranged to transmit the transaction for inclusion in the blockchain. For example, blockchain transaction device 100 may send a transaction directly to a blockchain management device, e.g., blockchain management device 131 or 132. For example, blockchain transaction device 100 may send the transaction to other devices in the network who in turn forward the transaction so that it reaches one or more blockchain management devices.

A blockchain management device, such as blockchain management device 131 or 132, collects transactions into a block and obtains a consensus proof for the block. The consensus proof may be a proof of work, or a proof of stake, etc. The completed block is transmitted in the network, e.g., to other blockchain management devices. A blockchain management device that obtain a proof of work consensus proof is sometimes referred to as a miner. A blockchain management device that obtains a proof of stake consensus proof is sometimes referred to as a minter or validator.

It may happen that multiple blocks are created by different blockchain management devices at approximately the same time and distributed in the network. In that case the longest chain rule may decide which block is the true next block in the chain.

Blockchain transaction device 100 is configured to create transactions. After a transaction is created, e.g., a transfer of Bitcoin value, by blockchain transaction device 100, the device may broadcast the transaction to the network where eventually it will be collected into a block. A transaction may have one or more transaction inputs and one or more transaction outputs. The transaction may refer to a previous transaction output as a new transaction input. In an embodiment, a transaction output comprises a so-called address, e.g., a key identifier. Later transfers of that output require a signature by the corresponding key. For example, a transaction input may comprise a reference to a previous transaction, and an unlock script, e.g., a scriptSig. For example, a transaction output may comprise a locking script. The unlock script, e.g., scriptSig combined with the locking script, e.g. scriptPubKey, in the referenced previous output produce a verifiable script. If the verifiable script can be executed successfully, then the transaction is valid. The transaction may also comprise the asset to be transferred, e.g., an amount of cryptocurrency, a domain name, etc. An unlock script, e.g., scriptSig, may contain two components, a signature and a public key. The public key must match a hash given in the locking script of the redeemed output. The public key is used to verify the redeemer's signature, which is the second component. For example, the second component may be an ECDSA signature over a hash over data derived from the transaction.

In an embodiment, the blockchain transaction device comprises a high security data area and a low security data area. For example, the high security data area may be used to store private keys, whereas the low security data area may comprise less sensitive information, e.g., the corresponding public keys. Furthermore, the blockchain transaction device comprises a processor circuit system configured to execute a cryptographic kernel application, and a transaction application. The cryptographic kernel application has access to the high security data area, so that it can perform operations that involve a private key. The transaction application has access to the low security data area; for example, it may perform operations involving the data in the low security area, e.g., involving public keys, or key identifiers, or it may call on the cryptographic kernel application to perform the private key operations.

There are several ways to implement the high and low security data areas in a memory system, and the processor circuit system. Schematically, one embodiment is shown in FIG. 1a.

Shown in blockchain transaction device 100 of FIG. 1a, the memory system comprises a low security memory 110 and a high security memory 210, for storing the low and high security data areas respectively. For example, the high security memory 210 may be used to store private keys, whereas the low security memory 110 may comprise less sensitive information, e.g., the corresponding public keys. Access to high security memory 210 is restricted, for example, only restricted application may access the high security memory 210. For example, software or hardware measures may be taken to restrict access to the high security memory 210. Blockchain transaction device 100 may comprise a low security processor circuit 120 and a high security processor circuit 220. The high and low security processor circuits may be used to execute the cryptographic kernel application and the transaction application respectively. The high and low security data areas may store the computer instructions implementing the cryptographic kernel application and the transaction application respectively, or part thereof.

For example, in an embodiment, the high security memory 210 (e.g., a first memory) and the low security memory 110 (e.g., a second memory) may be physically different memories. For example, in an embodiment, the high security processor circuit 220 (e.g., a first processor circuit) and the low security processor circuit 120 (e.g., a second circuit) may be physically different circuits, or physically different parts of a larger circuit, or at least in part. The terms high and low are relative to each other.

Figure 1B:
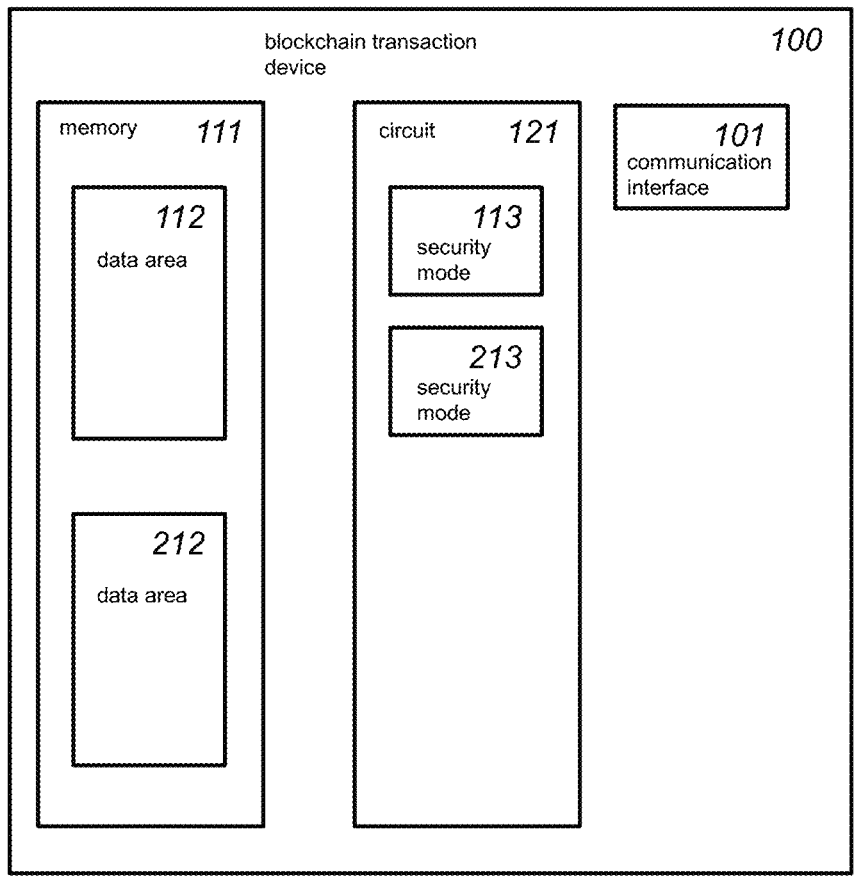
Figure 1C:
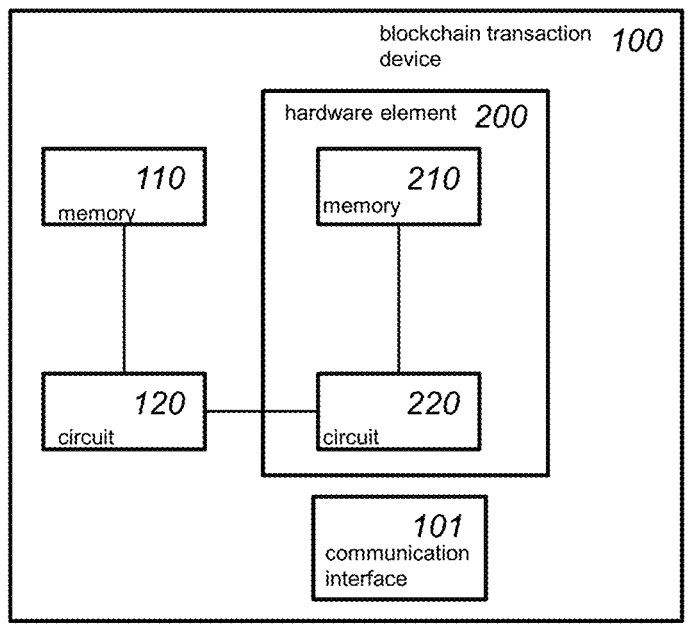
Figure 1D:
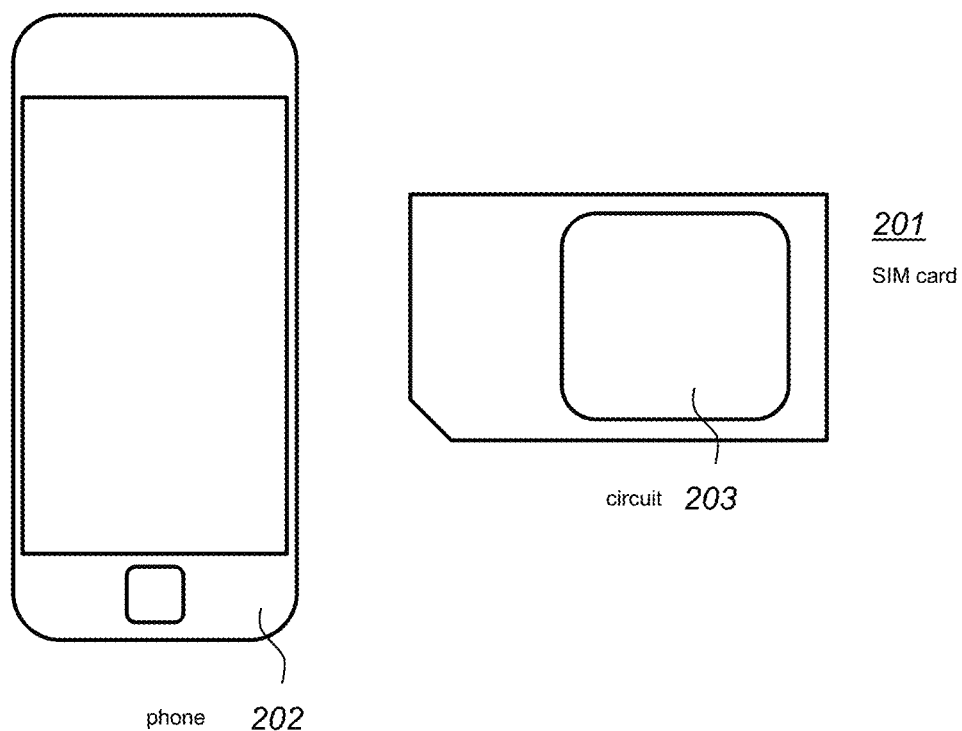

For example, the high security memory 210 and the high security processor circuit 220 may be combined in a hardware element 200, e.g., as shown in FIG. 1c. The hardware element may be integrated in device 100, or may be separable from device 100. For example, in an embodiment, the blockchain transaction device is comprised in a mobile phone. The hardware element may be comprised in a Subscriber Identity Module (SIM). For example, FIG. 1d, shows a phone 202 and a SIM card 201. SIM card 201 comprises an integrated circuit 203. The integrated circuit implements memory 210 and circuit 220. In an embodiment, access to the SIM card is restricted. Memory 110 and circuit 120 may be implemented in phone 202. When card 201 is inserted in phone 202, the full functionality of the blockchain transaction device is obtained.

For example, phone 202 may be a mobile phone with a SIM card 201. SIM card 201 runs the cryptographic kernel application and a processor circuit on phone 202 runs the transaction application. The transaction application may be a regular blockchain application, except that when actions need to be performed using the private key, the cryptographic kernel application is called by the transaction application. Further differences are described herein. In an embodiment, the cryptographic kernel only supports signing with a private key stored in the high security data area. In that case other actions on keys are done through the transaction application. More advanced embodiments may offer additional functionality in the cryptographic kernel.

To reduce exposure of a private key, a public/private key pair may be generated in the cryptographic kernel. The public key may then be exported to the transaction application, while the private key remains stored in the high security data area.

The private key that is generated may be independent from input of the transaction application. In embodiments, the transaction application may have more involvement in the keys that are stored in the high security data area.

For example, in an embodiment, a public/private key pair may be obtained or generated by the transaction application. The private key may then be imported in to the cryptographic kernel. The public key may remain stored in the low security data area, and the private key is stored in the high security data area. The latter option reduces computation overhead for the cryptographic kernel, and may also be used to import keys from other blockchain applications.

For example, in an embodiment, a public/private key pair may be generated by the cryptographic kernel, but based or partly based on input of the transaction application. For example, the transaction application may generate a seed and import the seed to the cryptographic kernel. The public/private key pair may then be generated in the cryptographic kernel based wholly or partially upon the seed. The public key may then be exported to the transaction application. The private key may remain stored in the high security data area. If the private key is generated deterministically from the seed and possible additional data, then it may be generated anew whenever it is needed. In the latter case, the cryptographic kernel could just store the seed and possible additional data, and not the private key itself.

FIG. 1b schematically shows another option to separate access to the private keys and the generation of transactions. The embodiments illustrated with FIG. 1b are the same as those illustrated with FIGS. 1a, 1c and 1d except that they use a single memory 111 and a single processor circuit 121. Memory 111 comprises a low security data area 112 and a high security data area 212. The device 100 may comprise further memories or processor circuits for other purposes. Processor circuit 121 is configured with a low security mode 113 and a high security mode 213. When processor circuit 121 is in low security mode 113, then circuit 121 has access to low security area 112. When processor circuit 121 is in high security mode 213, then circuit 121 has access to high security area 212. For example, circuit 121 may be configured with memory separation technology. For example, circuit 121 may use security functions such as Arm's Trust-Zone. For example, circuit 121 may be a Trusted Platform Module (TPM, also known as ISO/IEC 11889), etc.

For example, blockchain transaction device 100 may have a kernel having a user mode and a kernel mode, wherein the cryptographic kernel runs in kernel mode, but the transaction application runs in user mode. For example, blockchain transaction device 100 may be arranged so that applications that run in user mode do not have access to the high security area.

Note that hybrids between embodiments according to FIG. 1b and the other figures are possible. For example, in an embodiment the low and high security areas are in physically different memories, but they are accessed from a single circuit. For example, in an embodiment, the low and high security areas are in a physically single memory, but they are accessed from a high and low security circuit.

In the remainder we will assume an embodiment as in FIG. 1a. In particular we assume embodiments as in FIG. 1c or 1d, wherein the high security parts form a separate hardware element, such as a SIM card. However, it is noted, that a skilled person may straightforwardly transform such an embodiment to one in which the memory system uses two memories but, say, on a single circuit or single PCB, or to one that uses a single memory storing two areas, etc., and/or transform to an embodiment in which the processor circuit uses two processor circuits but, say, integrated on a single circuit, or system on chip, or single PCB, or to one that uses a single processor circuit using two modes.

Figure 3:
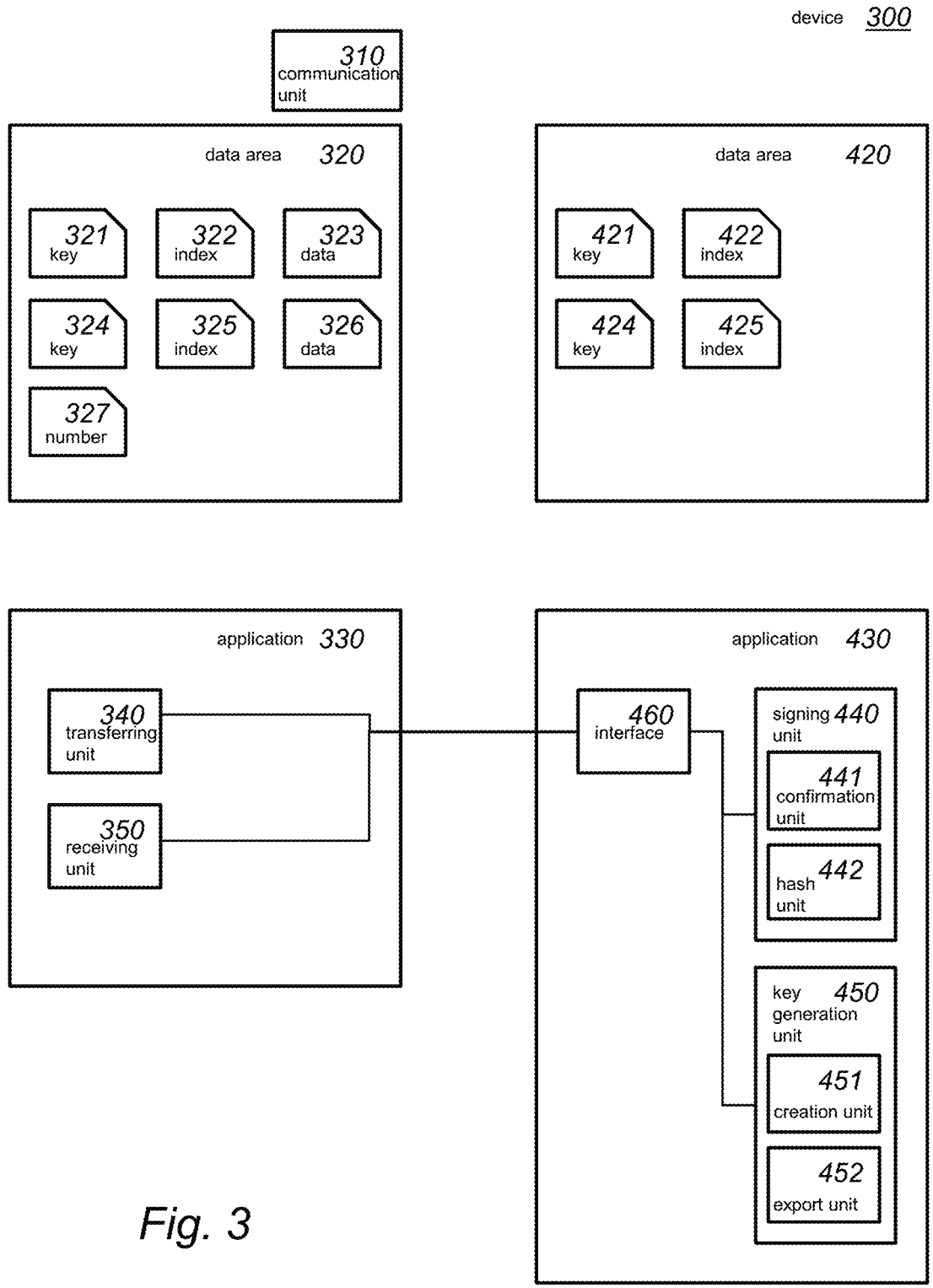

FIG. 3 schematically shows an example of an embodiment of a blockchain transaction device 300. Blockchain transaction device 300 may be implemented on the hardware architectures described with reference to FIGS. 1a-1d. In particular, blockchain transaction device 300 may be implemented in a phone and SIM card, such as shown in FIG. 1d.

The transaction device is implemented on one or more processor circuits, examples of which are shown herein. FIG. 3 shows functional units that may be functional units of the processor circuit. For example, FIG. 3 may be used as a blueprint of a possible functional organization of the processor circuit. The processor circuits are not shown separate from the units in FIG. 3. For example, the functional units shown in FIG. 3 may be wholly or partially implemented in computer instructions that are stored at device 300, e.g., in an electronic memory of device 300, and are executable by a microprocessor of device 100. In hybrid embodiments, functional units are implemented partially in hardware, e.g., as coprocessors, e.g., crypto coprocessors, and partially in software stored and executed on device 300.

Blockchain transaction device 300 comprises a communication unit 310 to communicate with the other devices of the blockchain system, e.g., with other blockchain transaction devices and/or with blockchain management devices. The various devices of the blockchain system communicate with each other over a computer network. The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of the blockchain system as needed. For example, the connection unit may comprise a connector, e.g., a wired connector, e.g., an Ethernet connector, or a wireless connector, e.g., an antenna, e.g., a Wi-Fi, 4G or 5G antenna. For example, blockchain management devices 131, 132 and blockchain transaction devices 100, 300, etc., may comprise a communication interface. In a blockchain management device, the communication interface may be used to receive transactions for recording in a block on the blockchain. Transactions may be digital transactions, e.g., received in electronic form.

Blockchain transaction device 300 comprises an electronic memory system comprising a high security data area 420 and a low security data area 320. Preferably, the protection of the high security data area 420 is at least as good as that of low security data area 320. For example, read access to the high security data area may only be provided to the hardware element, or to the cryptographic kernel application, or to an application running in a protected mode, e.g. kernel mode. For example, blockchain transaction device 300 may be arranged so that the transaction application has access to the low security data area, e.g., read and write access. For example, the low security data area may be used to store public keys, and/or other data related to the blockchain. For example, blockchain transaction device 300 may be arranged so that the transaction application does not have access to the high security data area; in particular no read access, but in embodiments, also no write access. For example, blockchain transaction device 300 may be arranged so that the cryptographic kernel has access to the high security data area, e.g., read and write access. The cryptographic kernel may have access to the low security data area, but this is not needed; in fact in many embodiments, the cryptographic kernel does not have such access. For example, the high security data area may be used to store private keys, and/or other data related to the blockchain.

The transaction application preferably does not have access to the high security data area. Nevertheless, implementations are possible wherein the transaction application has some limited access to the memory. For example, the transaction application may only have write access to the high security data area. This functionality may be used to allow the transaction application to import keys, e.g., from a legacy application, yet still prevents the transaction application from obtaining the private keys from the high security data area. Another possibility is that the transaction application is capable of reading the high security data area, yet that data is encrypted with a secret key under control of the cryptographic kernel. In any case, the transaction application may have indirect access to the high security data area, through the cryptographic kernel application, e.g., by signing, etc.

FIG. 3 shows a blockchain transaction device 300 with a low security data area 320 and a high security data area 420. Low security data area 320 stores one or more public keys; shown are public keys 321 and 324. High security data area 420 stores the corresponding private keys; shown are private keys 421 and 424 corresponding to public keys 321 and 324 respectively. The link between a public key in area 320 and a private key in area 420 may be established in various ways. For example, the memory address of corresponding keys may be related, e.g., by a fixed offset. For example, areas 320 and 420 may each comprise an array of keys, wherein each position in the array in 320 corresponds to a position in the array in area 420. For example, the same index in the array may store corresponding keys. The key index may be implicit as in the above example, however it may also be explicit.

In an embodiment, public keys and private keys may be associated with each other by storing them with a common tag, or key index. For example, high security data area 420 may be arranged to store multiple private keys with a corresponding key identifier. The key identifier may comprise a hash over the public key corresponding to the private key. For example, the key identifier may be a bitcoin address. A Bitcoin address is a 160-bit hash of the public portion of a public/private ECDSA key pair.

For example, the public key could be stored together with the key identifier and the corresponding private key could be stored with the same key identifier. Instead of using the key identifier in the high security data area 420 to identify keys, high security data 420 area may be arranged to store the private keys, with a corresponding key index. This option is shown in FIG. 3; private keys 421 and 424 are stored together with a key index 422 and 425 respectively. For example, the key index may be a 16 or 32 bit number, which may be randomly, or sequentially, etc., assigned. For example, the key index may be chosen by the transaction application, e.g., shared on the key generation interface, or it may be chosen by the cryptographic kernel, e.g., returned on the key generation interface. Low security data part 320 stores the same key indices; shown are key pair indices 322, 325. For example, key index 322 may equal key index 422, and key index 325 may equal key index 425. This has the advantage that a key index can be much shorter than a key identifier, and is furthermore under control of the application. This saves storage space in the high security data area. If a smaller index is used than the key identifier, say 2 or 4 bytes, then the low security area can comprise a map from the internal key index to the key identifier, e.g., to the external bitcoin address.

In an embodiment, the public and private keys are implicitly associated based on their position in the low and high security area. In an embodiment, the public and private keys are associated by being stored with common information. The common information may be a key index, or a key identifier. The former being shorter than the latter. For example, a key identifier may be 160 bits or more, whereas the key index may be 32 bits or less. Furthermore, the key identifier may be derived from the public key, whereas the key index may be chosen by the transaction application itself. If a key index is used, the low security part may also store the corresponding key identifier, such as a bitcoin address. Although the key identifier may be computed from the public key, it is convenient if the key identifier is available in storage.

Low security data area 320 may comprise account data associated with the key pairs. For example, shown in area 320 is account information 323 and 326 corresponding to public/private key pairs 321/421 and 324/424 respectively. The account information may for example comprise information regarding the assets bound to the public/private key pair, e.g., an amount of crypto currency. This information could also be obtained elsewhere. For example, it may be derived from the blockchain 230; having it available locally is convenient so that transactions can be generated quickly.

Blockchain transaction device 300 comprises a processor circuit system configured to execute a cryptographic kernel application 430 and a transaction application 330. Transaction application 330 is configured to generate a transaction. For example, transaction application 330 may comprise a transferring unit 340 configured to generate a transaction and to transmit the transaction for inclusion in the blockchain. For example, transferring unit 340 may be configured to send the transaction to a blockchain management device, e.g., in network 130, e.g. via a node in network 130.

The transaction generated by transferring unit 340 comprises a signature by a private key. To generate the signature, transferring unit 340 is configured to call a signing interface of the cryptographic kernel application to obtain the signature. Cryptographic kernel 430 comprises an interface 460 to receive requests, e.g., a signing request, from transaction application 330.

For example, the signature may unlock a previous locking script in a previous transaction. The generated transaction may refer to the previous transaction, e.g., by number. The signature may be over part of the transaction itself, or over data derived therefrom. The signature proves ownership of the private key, and thereby the authorization to transfer the funds. The transaction may also comprise other components than a signature. For example, the transaction may comprise an indication of the transferred asset, e.g., a value field; the transaction may comprise a target of the transfer, e.g., in the form of a locking script, such as a pay to public hash script.

Cryptographic kernel 430 comprises a signing unit 440. The signing unit 440 is configured to access the high security data area and compute the signature from the private key. For example, signing unit 440 may execute a signing algorithm that corresponds to the signature algorithm, e.g., the ECDSA signing algorithm, etc. The correct signing key may be selected through a key index or key identifier which may also be supplied on interface 460. The signing unit 440 may directly receive a hash value to sign from interface 460 and transaction application 330. This keeps the cryptographic kernel small, as it does not need a hashing algorithm. In theory, this keeps the threat that a rogue or hacked transaction application may perform transactions that are not authorized by the user. Still, this set-up provides several advantages, an attacker cannot extract the private key from area 420, so that the attacker needs to have access to device 300 at the time he wants to attack a particular key.

In an embodiment, the cryptographic kernel application is configured to obtain signing data from the signing interface, display information obtained from the signing data on a display of the blockchain transaction device before signing the signing data. For example, transaction application 330 may be configured to supply the data to be signed on interface 460, rather than its hash. The data to be signed includes information on the transaction; for example, the data to be signed may comprise the asset to be transferred and/or the target of the transaction. Signing unit 440 may be configured to obtain the asset information and/or target information from the data to be signed. For example, signing unit 440 may comprise a configuration unit 441 which may be configured to obtain this information from the data and to ask for confirmation from the user. For example, the obtained data may be displayed on a display, e.g., a display integrated in the blockchain transfer device. In this regard, embodiments are advantageous that comprise a display screen and an input unit, e.g., a touch screen and/or a screen and a keyboard or the like; such may be found in a mobile phone. For example, configuration unit 441 may be configured to display the information on the screen and obtain confirmation through the input unit. This has the advantage that, even if the transaction application is hacked, a user can still know if the transaction that is performed is the intended transaction. Note that hacking the cryptographic kernel is considered to be harder to do, since it is separate from the transaction application. For example, in an embodiment, the cryptographic kernel does not have access to the communication unit; so that network traffic cannot alter the cryptographic kernel. Network traffic could influence the transfer application, which in turn may give commands to the cryptographic kernel, but this is through such an indirect route that hacking the cryptographic kernel is hard.

After the confirmation has been obtained, a hash unit 442 may hash the data that is to be signed and perform the remainder of the signing algorithm. After signing, with or without confirmation, the signature is returned to transaction application 330, e.g., to transfer unit 340.

Accordingly, in an embodiment a transaction may be done in the application, e.g., formatted, and signing the transaction may be done in a hardware element, such as a Secure Element. In turn the hardware element may return a signed transaction that can be broadcasted to the associated blockchain/cryptocurrency network by the application which holds the wallet function.

In an embodiment, cryptographic kernel 300 comprises a key generation unit 450 configured to generate a new public/private key pair. For example, key generation unit 450 may comprise a creation unit 451 configured to generate a public key and private key pair. For example, the creation unit 451 may execute a key generation algorithm according to ECDSA. In an embodiment, the high security processor circuit is able to calculate the private key from the seed, etc., e.g., by first computing the public key.

The key generation unit 450 may comprise an export unit 452 configured to store data determining the private key in the high security data area. For example, export unit 452 may store the private key itself, an encryption of the private key, key derivation information, and/or a seed in the high security data area. If the seed is already stored in the high security data area, then export unit 452 may export the key derivation information to the transaction application, e.g., for storage in the low security data area.

The export unit 452 may be configured to store the private key in the high security data area, and export the public key to the transaction application. For example, the public key may be associated with a key index or key identifier by export unit 452. For example, the key index may be a sequential or random number. For example, the key identifier may be hash over the public key. The export unit may also omit this information, e.g., transaction unit 330 may compute the key identifier itself.

Note that it is not needed that the public key is stored in the low security data area 320, instead it may be stored in the high security data area. In that case, the export unit 452 may export a key identifier of the public key to the transaction application. The key identifier may be used by the transaction application to receive assets that are bound to the new key. If the public key is stored in the high security data area, then the public key may be exported to the transaction application when a transaction is generated, e.g., together with the needed signature.

The key identifier may also be used to support the creation and storage of multiple wallets for the same blockchain/cryptocurrency. Having multiple wallets is desirable since different wallets could support different needs of the user, e.g., one wallet may be a savings account and another a payment account. For example, the key identifier may indicate the wallet to which the key belongs; the key identifier may indicate more.

For example, interface 460 may comprise a key generation interface which calls the key generation unit 450. The transaction unit may be arranged to call the key generation interface when new assets, e.g., new funds, need to be received.

In an embodiment, key generation unit 450 may be configured to a buffer of private keys. Key generation may be done based on a seed, e.g., as in a Type 2 hierarchical deterministic wallet. Key generation unit 450 may, for example, be used by a receiving unit 350 of the transaction application. New key pairs may be used to bind assets to keys that are under control of the user. For example, the transaction application could receive a request to transfer assets to the user. For example, the user may indicate that someone want to transfer assets. The receiving unit 350 may then obtain a new public key, or a key identifier, and transfer it to the device or user that want to transfer the assets. The receiving unit 350 may use the key generation unit to produce a new key after the request is received; alternatively, the receiving unit 350 may generate a buffer of keys in advance. For example, key generation unit 450 may support the bitcoin protocols: BIP0032, BIP0039 and BIP0044. For example, see for example, key derivation in BIP0032. Also wallet structure may be according to BIP0032. A BIP or Bitcoin Improvement Proposal is a design document providing information to the Bitcoin community, or describing a new feature for Bitcoin or its processes or environment.

In an embodiment, interface 460 comprises a key storing interface, the cryptographic kernel application may be configured to receive a private key of a public key and private key pair, store the private key in the high security data area. For example, the key storing interface may be used for migration from other blockchain solutions. Using the interface, allows keys to be stored, even if they have been generated elsewhere. The key may be received in any suitable digital form. For example, the key storing interface may support a so-called mnemonic seed. A mnemonic seed is a set of multiple words to create backup and recovery capability and to be able, to migrate from one SIM to the other. Recovery services for mnemonic phrases may be supported as an extra option. In an embodiment, a so-called custodial service may be initiated. For example, multiple parties may be needed to agree to the custodial action. For example, in an embodiment, the transfer device is initiated by setting a seed, e.g., in the form of a set of multiple words. In the latter case a key derivation function may be applied to obtain the seed. Once a seed has been obtained, it can be stored in the high security data area. For example, setting the seed may be done through the key generation, key setting interface. In this way, the keys can be transferred to another device, since the public information can be copied, and the seed can be entered again, e.g., in the form of the same set of words.

For example, in an embodiment, private keys may be generated from a root seed. Also the mnemonic phrase, e.g. Mnemonic Code Words, may be derived therefrom. The root seed can be recovered from the mnemonin phrase, e.g. the Mnemonic Code Words.

Access to the root/mnemonic seed may be secured by a password as well.

For example, from the master seed, a master node, wallets/accounts, wallets/chains and addresses may be derived; e.g., as disclosed in BIP0032.

If the root seed is not generated by the cryptographic kernel then deriving of more child keys may be covered by the transaction application. The latter may use the cryptographic kernel only to store the associated seed and private keys. For example, the cryptographic kernel may be configured to sign transactions but not to generate the keys, which is done by the transaction application. If the root seed is generated by the cryptographic kernel then the derivation function may be implemented in the cryptographic kernel. The root seed can be generate and stored in the hardware element, e.g., by the cryptographic kernel.

The root seed may be inputted by or outputted to a user of the device, e.g., through a display and/or a keyboard as a mnemonic seed. The mnemonic seed that is associated to a root seed may require access to and interaction with a mnemonic word dictionary, e.g., a Word List. See for example BIP0039. Because the root seed and mnemonic seed are basically the same cryptographic entities, as they are two-way convertible, in an embodiment the root seed is stored not the mnemonic seed. The root seed can be used to generate the key pairs, e.g., in the cryptographic kernel.

The transaction application may support the cryptographic kernel in creating new keys. For example, the transaction application may be configured to collect entropy from the blockchain transaction device, and make the collected entropy available to the cryptography kernel application. The latter may be done through the key generation interface, a dedicated entropy interface, or indirectly. For example, the entropy may be reported to a cryptographic library that is used by the cryptographic kernel. For example, the transaction application may track touches and/or swipes on a touch screen and derive entropy therefrom, e.g., by taking a hash.

There are various ways in which the high security data area may be used to store private keys. For example in an embodiment, the private keys may be encrypted, e.g., they may require decryption and/or other additional processing before the private keys stored in the high security data area can be used. For example, the low security data area may comprise an optional binding number 327 which is needed to access the private keys in the high security data area. The binding number further hardens access to the private keys. For example, the binding number may help against attacks in which the SIM card is inserted into another device. For example, a private key may need to be decrypted using the binding number. The binding number may be 128 bits, or more. The binding number may be included on a signing interface, or on a key generation interface. The binding number may be hidden in the device or obfuscated.

The binding number may also be used as seed. For example, key derivation, and/or a further seed may be stored in the high security data area. The private key to be used may then be derived by applying a key derivation function (KDF) to the binding number 327, further seed, and key derivation information. The binding number 327 is optional.

Figure 4A:
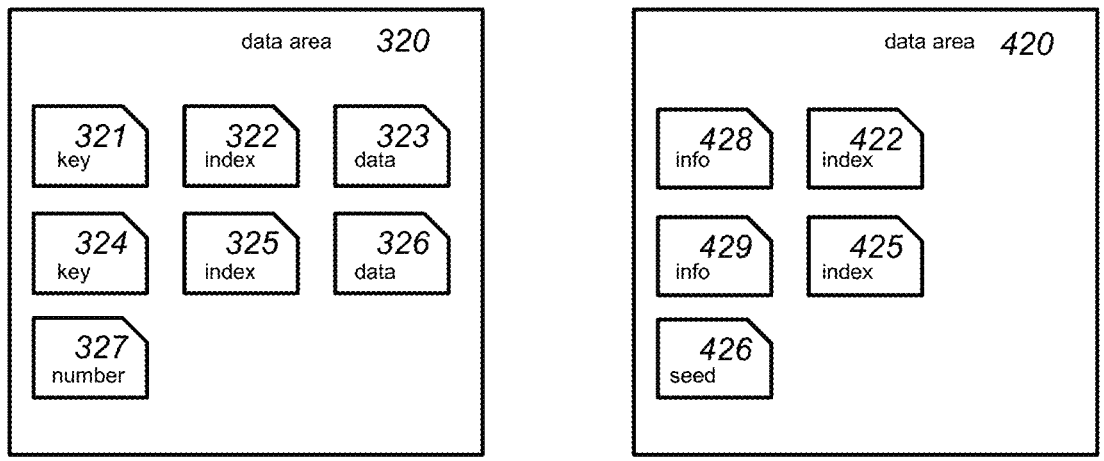

An embodiment using seeds is shown in FIG. 4a. The private key is stored in the high security data area as a seed 426. For each private key, the high security data area comprises key derivation information; shown are key derivation information 428 and 429 for keys 321 and 324 respectively. The cryptographic kernel application is configured to compute the private key from the seed if the private key is needed. For example, to compute the private key corresponding to key 321, a key derivation function may be applied to binding number 327, seed 426, and key derivation information 428. The key derivation may also be hierarchical, e.g., using multiple application of a key derivation function. Seed 426 may be generated by the cryptographic kernel, but it may also be set by the user, e.g., through the transaction application. The latter has the advantage that the seed can be re-entered if the SIM is lost.

Figure 4B:
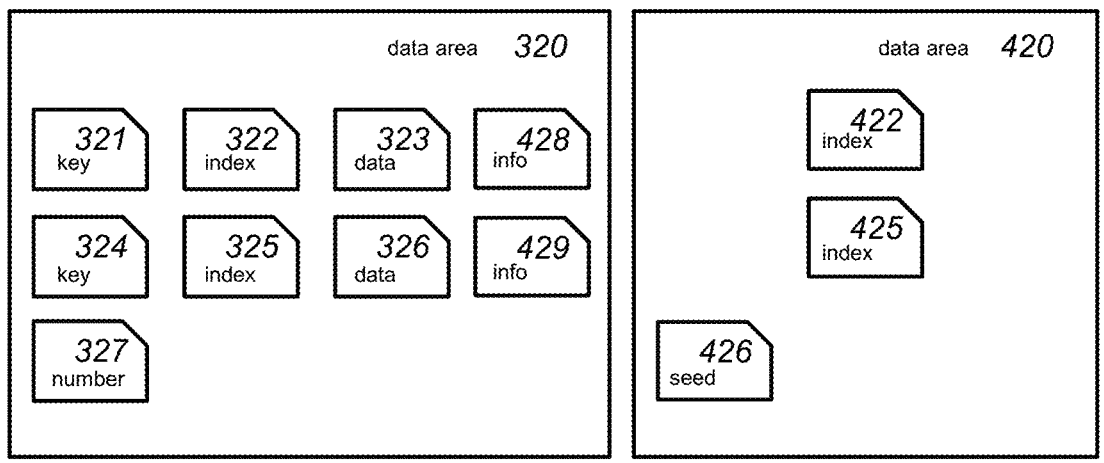
Figure 4C:
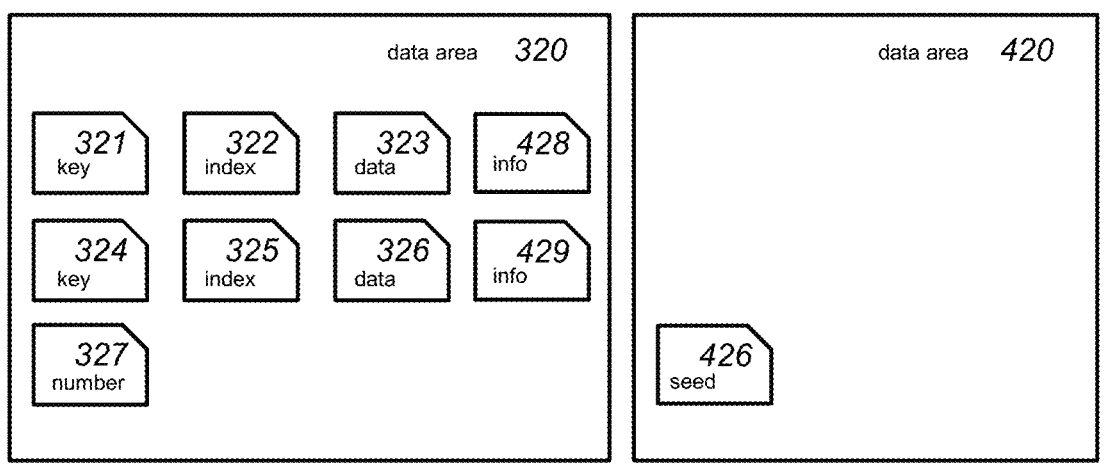

Instead of storing the derivation information in the high security area, the key derivation data, e.g., data 428 and 429, may be stored in the low security data area; this is illustrated in FIG. 4b. In an embodiment, the high security area only needs to store the seed. If a private key is needed, it is generated from information stored in the low security part and the seed, e.g., through a key derivation function, e.g., by applying a hash function. Storing the derivation information outside the high security data area has the advantage that it may be backed-up, e.g., in the cloud, e.g., by the transaction application. This approach is taken a step further in FIG. 4c. In this example, the low security data area stores both the key derivation data and the information on which keys are available, e.g., the key indices 422, 425. This means that the cryptographic kernel relies on the transaction device to learn which keys are available on the transaction device. On the other hand, the seed 426 is required, in the sense that without it the private keys cannot be recovered. Even if the low security data area stores the public key, the key derivation information, the key identifier, etc., then still the private key cannot be obtained, if there is no access to seed 426. For signing, the cryptographic kernel can be supplied with the information needed to derive the private key from seed 426. For key generation, the cryptographic kernel can return all the information that needs to be stored, except for seed 426.

For example, the signing interface may receive the key derivation information, and binding number 327 (if any). The signing unit 440 combines this information with seed 426 compute the private key and perform the requested signing. For example, the key generation interface may receive the key derivation information, and binding number 327 (if any). The key generation unit 450 combines this information with seed 426 to compute the private key. Next the corresponding public key may be computed and/or the key identifier and exported to the transaction application.

In an embodiment, the cryptographic kernel and the transaction application are linked to each other. This has the advantage that the hardware element on which the private keys reside cannot be taken out of the transaction device and inserted in another device to obtain the keys. One way to achieve this is to create a security domain which is coupled to the transaction application and to the cryptographic kernel application. Recent SIM cards complying with recent specifications offer the option of security domain generation. Security Domains (SD) are used for the management of Service Provider applications on a SIM card, e.g., issued by the Mobile Network Operator (MNO). Removing the SIM card from the phone and placing it in another phone with the same application will simply not work. When moving the SIM in another phone, the applications on the smartphone need to go through a binding procedure.

The security procedures could impede on the backup of SIM data. Instead, the transaction application may connect to a new cryptographic kernel on a new SIM card by the binding procedure. When a SIM is replaced, the binding needs to be done again. In a seed based application, a user may enter the seed, e.g., as a passphrase, in particular a mnemonic multiple word passphrase, to recover the keys into the SIM.

If security domains are not available, one may alternatively use hardware fingerprinting. For example, the cryptographic kernel application may be configured to obtain a fingerprint of the blockchain transaction device, and to refuse the signing interface if the obtained fingerprint does not agree to a previously stored fingerprint. The binding number 327 discussed above may be part of such a fingerprint.

But many other properties of the hardware, e.g., may be used for the fingerprinting, e.g., the type of processor used in the phone, the amount of installed, fixed, memory, etc. For example, these properties, which preferably cannot be changed, may be hashed together into a hardware fingerprint.

Below a worked example of a prototype of a particular embodiment is presented. This illustrates how some of the features described above could be implemented. The particular embodiment may be extended with features presented above. A hardware wallet using a secure hardware element is created to secure the blockchain private keys, which has many advantages over software and paper wallets. The hardware wallets store the private key in a secure location on the device, like the protected area of a microcontroller. Data stored in such a secure location on the device cannot be read out in plaintext format. This protects the data, e.g., the blockchain private keys stored in the hardware wallet from attacks by malicious users. Similarly, a SIM card can be used to store the blockchain private keys because the access to the SIM card's data is restricted to the carriers or subscribers of the SIM card. This prevents the users from accessing the SIM memory and hence protects the data stored in the SIM card from accidental or intentional disclosure. This idea can be leveraged to store the blockchain private keys in the SIM cards. Secure blockchain transactions can be ensured by protecting the private keys from disclosure. One need not secure the bitcoins but only the private key associated with the blockchain wallet address. The embodiment below uses a Java Card Applet which generates and securely stores the blockchain private keys in a SIM card. The embodiment below adheres to the Bitcoin standard, nevertheless the design and configuration can be used for other blockchain types; for example, having other random generators and hashing algorithms to generate the private key and derive the public key and wallet address.

The Java Card applet, e.g., a cryptographic kernel may be loaded to the SIM card by a SIM toolkit loader. A phone or an emulator from the Gemalto developer suite can be used for testing purposes.

Note that a bitcoin private key can be generated from the public key corresponding to a private key. Random 256 bit keys may be selected to be the private key. External seeds can be provided to enhance the randomness of the 256 bit private key selected. This 256 bit private key is set as the private key for the SECP256K1 Koblitz curve along with other parameters of the curve. The public key for the set private key is generated by point multiplication with the base point G of the Koblitz curve. The public key is hashed by SHA 256 followed by RIPEMD 160 to obtain the hashed public key which when encoded in Base 58 gives the bitcoin address associated with the random private key selected in the first step. The bitcoin address is analogous to a bank account number to which the bitcoins are sent in a transaction and the private key is used to claim the bitcoins sent to its corresponding bitcoin address.

In order to develop a java card applet to generate and store the private keys associated with a bitcoin address efficiently, one may use tools such as Eclipse with java card development kit or other development tools like Java COS, loader software to load the cap file of the developed applet into the SIM card, e.g., Gemalto developer suite or SIM Alliance Loader, development SIM cards, card reader and a phone to test the applet. For example, one may use a (development) SIM card which supports Java Card 3.0.4 or higher to obtain support for all the required functions and algorithms, e.g., to generate a bitcoin address and hence the same is suggested for use in the future.

In order to generate the random number, either the ALG_PSEUDO_RANDOM algorithm or the ALG_SECURE_RANDOM algorithm of the javacard.security.RandomData library present in the java card development may be utilized. For example, the ALG_SECURE_RANDOM may be selected to generate the random number. Additionally, the randomness of the output can be increased by feeding a seed to the algorithms using the setSeed method of the same javacard.security.RandomData library. This method takes as parameters an input buffer, its offset and length. The input buffer to the setSeed method can be fed with random values obtained from external sources. For example: the transaction application may be configured so that the user is requested to swipe randomly on the screen and the points on the screen generated by this random swiping can be fed as the random input buffer to the setSeed method. This type of screen interaction cannot be directly incorporated into the Java Card applet as it lacks event listeners like the onTouchListener of android which may be used to add such a functionality. The random number may be generated by the ALG_SECURE_RANDOM and hashed by the SHA256 algorithm of the javacard.security.MessageDigest library. The getInstance method takes as its first argument the algorithm to use for performing the message digest or compression. Some of the valid algorithms are ALG_MD5, ALG_RIPEMD160, ALG_SHA, ALG_SHA_224 through ALG_SHA3_512. The bitcoin standard requires the use of ALG_SHA_256. However, the development SIM card provided supported only until Java Card 2.2.2. The developer tool used (Java COS) restricted the permit to use of ALG_SHA_256 to Java Card version 3.0.4 or higher. The same was noticed in Eclipse with Java Card development kit installed. Hence, for purpose of implementation, ALG_SHA was used. However, this does not mean that the standard bitcoin address can never be created as the standard SHA_256 algorithm can be used to perform the message digest in the applet provided the SIM card supports Java Card 3.0.4 or higher.

Once the random 256-bit number is generated by using the ALG_SECURE_RANDOM and hashed by the ALG_SHA, the obtained output is the private key for which the corresponding bitcoin address is to be determined. To determine the bitcoin address, first the public address is to be calculated by point multiplication which is functioned as repeated point addition to the fixed point G on the elliptic curve SECP256K1. The SECP256K1 Koblitz curve is the standard elliptic curve used for bitcoin. The parameters of the elliptic curve are set prior to performing the elliptic curve multiplication. Private and public keys may be created accordingly. The length of the elliptic curve keys to be used for bitcoin address generation is 256 bit and the same is set in the buildkey function of the javacard.security.KeyBuilder library.

The parameters to be set for the elliptic curve SECP256K1 before the public key is generated by point multiplication are the Weierstrass coefficients (A, B), the field FP, base point on curve to which the private key is point multiplied to get the public key G, order of the base point R and its cofactor K. These parameters have a fixed value for the SECP256K1 curve. Once these parameters are set, the genKeyPair function of the javacard.security.KeyPair library generates the public key for the set private key and elliptic curve parameters. Note that the private key is also set along with the other parameters using the method setS of the javacard.security.ECPrivateKey.

Once the public key is generated, it is hashed using the ALG_SHA_256 followed by the ALG_RIPEMD160. The ALG_SHA_256 is replaced with the ALG_SHA as stated previously due to the lack of Java Card 3.0.4 support on the development SIM cards provided.

In order to represent the hashed public key using fewer symbols in alphanumeric representation Base58 encoding is adopted. Base 58 encoding includes the 26 capital letters, 26 small letters and 10 numerals excluding the 4 characters 0 (number zero), O (capital o), 1 (Lower L) and I (capital i). These 4 characters are excluded as they can be mistaken for small o and number 1, both of which are included in the Base 58 encoding.

Figure 5:
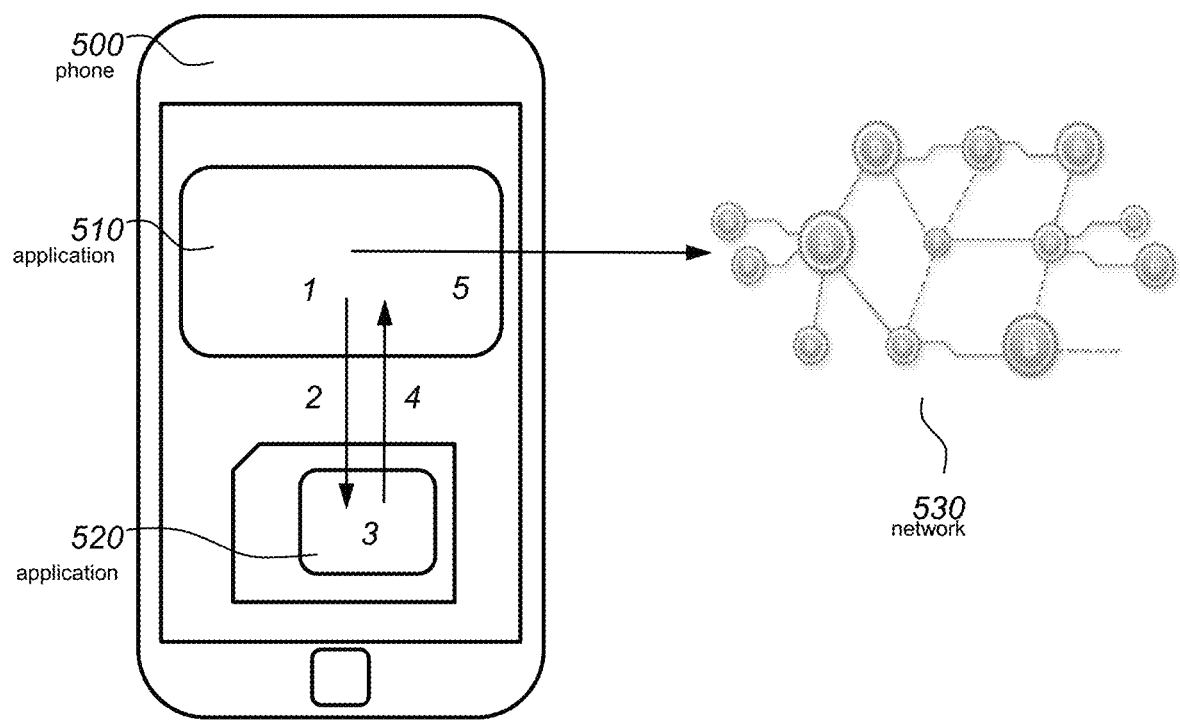

The final applet has access to a random private key. The private key will be securely stored in the SIM card and will not be exposed from the secure element of the SIM card. Together with the cryptographic kernel that handles the private key operations, a transaction application, e.g., an android application, can be developed where the blockchain (e.g. bitcoin) transactions are generated. These transactions may later be sent to the java card applet in the SIM card where the transactions are signed. The signed transactions are sent back to the transaction application from where the transactions are published to the blockchain network. Therefore, the secret private key associated with a blockchain address never leaves the secure element of the SIM card. This is pictographically represented in FIG. 5. FIG. 5 shows a mobile phone 500 with a SIM card on which is installed a transaction application 510 and a cryptographic kernel 520 respectively. The phone can connect to the blockchain network 530. FIG. 5 schematically shows 5 parts in performing a transaction.

1. Transaction is created in the online blockchain application.
2. The transaction is sent to the offline java card applet for signature.
3. The transaction is signed in the java card applet.
4. Signed transaction is sent back to the online blockchain application.
5. Signed transaction is broadcast to the bitcoin network.

The communication between the android application and the Java card applet can be established as given below. One of the attractive features of security SIM domains enforces access control from phone apps. A security domain containing the cryptographic kernel, e.g. the private key and signing app can have restricted access from authorized phone applications. This process is controlled by the MNO and provides an extra layer of security, restricting even authorized apps that have been tampered with. The app allowed to access the secure SIM locker has to be exactly the same as the whitelisted app.

Storing and generating private keys for the phone user in the secure domain has a number of benefits. For example:
1. Users are relieved of the responsibility to manage their private signing keys for blockchain interactions
2. The key is stored outside of the realm of OS and Apps and therefore provides a secure barrier from malware and malicious apps trying to steal the key or sign transactions.

Signing is done outside of the realm of the OS and Apps. By doing so, the private key never has to leave the secure domain. This is important because outside the secure domain it would be more exposed to attackers. However, this may not be enough. In an improvement, it is assured that the transaction the user creates is the same as the transaction the java card applet is about to sign using the users private key. This is something that conventional wallets struggle with, because the information send to the signing hardware needs to be displayed to the user before signing on said hardware. As the cryptographic kernel is installed on a mobile phone, this is possible since a display and input is available. For example, before actually signing the transaction, the signing applet may display the transaction information and prompt the user for review and approval. Optionally, a secure applet, e.g. the signing applet, may provide an option to the user to display the private key, root seed or mnemonic seed to the user outside the realm of the OS and Apps. Thus the user may write down the private key, root seed or mnemonic seed without exposure to the OS and Apps, or may use the information for pairing the wallet with another secure hardware element.

Yet, a further layer of security can be provided using device fingerprinting. This allows us to link the cryptographic kernel to certain device characteristics. An advantage of this approach is that it works independently of the SIM. However, similar functionality is available when coupling a secure domain to a specific app. Removing the SIM card from the phone and placing it in another phone with the same application simply does not work.

The hardware wallet prototype described above, may leverage existing, proven, SIM security technology and utilizes a storage and execution functions. This interface not only work with permissioned apps on the phone, but the cryptographic kernel also needs to access to the locker holding the private key.

In the various embodiments of the transaction device 100, 202, 201, 300 and 500, the communication interface may be selected from various alternatives. For example, communication interface may be a network interface to a local or wide area network, e.g., the Internet. The transaction device may have a user interface, which may include well-known elements such as one or more buttons, a keyboard, display, touch screen, etc. The user interface may be arranged for accommodating user interaction for performing transactions, e.g., to make payments, or to create new keys to receive payments. The new keys may also be sent out over the communication interface.

The memory system that implements the high and low security data areas may be implemented as one or more electronic memories, say a flash memory, or the like. The memory system may comprise multiple discrete memories together making up the memory system. The memory system also comprise temporary memory, say a RAM, e.g., to hold temporary computation, e.g., the transaction as it is being made, or the signature as it is being made.

The transaction device 100, 202, 201, 300 and 500, device comprise a processor circuit system. Typically, the processor circuit system comprises one or more microprocessor (not separately shown) which executes appropriate software stored at the transaction device; for example, that software may have been downloaded and/or stored in a corresponding memory, e.g., a volatile memory such as RAM or a non-volatile memory such as Flash (not separately shown). Alternatively, the processor circuit system may, in whole or in part, be implemented in programmable logic, e.g., as field-programmable gate array (FPGA). The transaction devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

The processor circuit system may be implemented in a distributed fashion, e.g., as multiple processor circuits. Part or all of the memory may be an electronic memory, magnetic memory, etc. For example, the storage may have volatile and a non-volatile part. Part of the storage may be read-only. The circuits may also be, FPGA, ASIC or the like.

Figure 6:
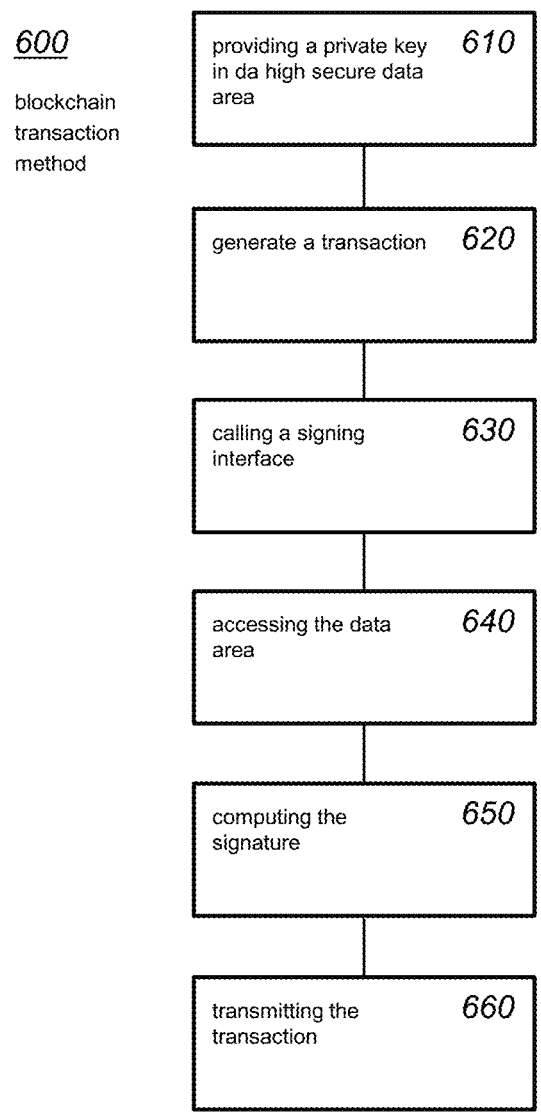

FIG. 6 schematically shows an example of an embodiment of a blockchain transaction method 600. Blockchain transaction method 600 is arranged to generate a transaction for a blockchain. For example, blockchain transaction method 600 could be executed on hardware such as device 100, 202, 201, 300 and 500. Method 600 comprises providing (610) a private key of a public key and private key pair in a high security data area, generate (620) a transaction in a transaction application, said transaction comprising a signature, calling (630) a signing interface of a cryptographic kernel application to obtain a signature for including in the transaction, accessing (640) the high security data area and computing (650) the signature from the private key, by a cryptographic kernel application comprising the signing interface, transmitting (660) the transaction for inclusion in the blockchain.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figures 7A, 7B:
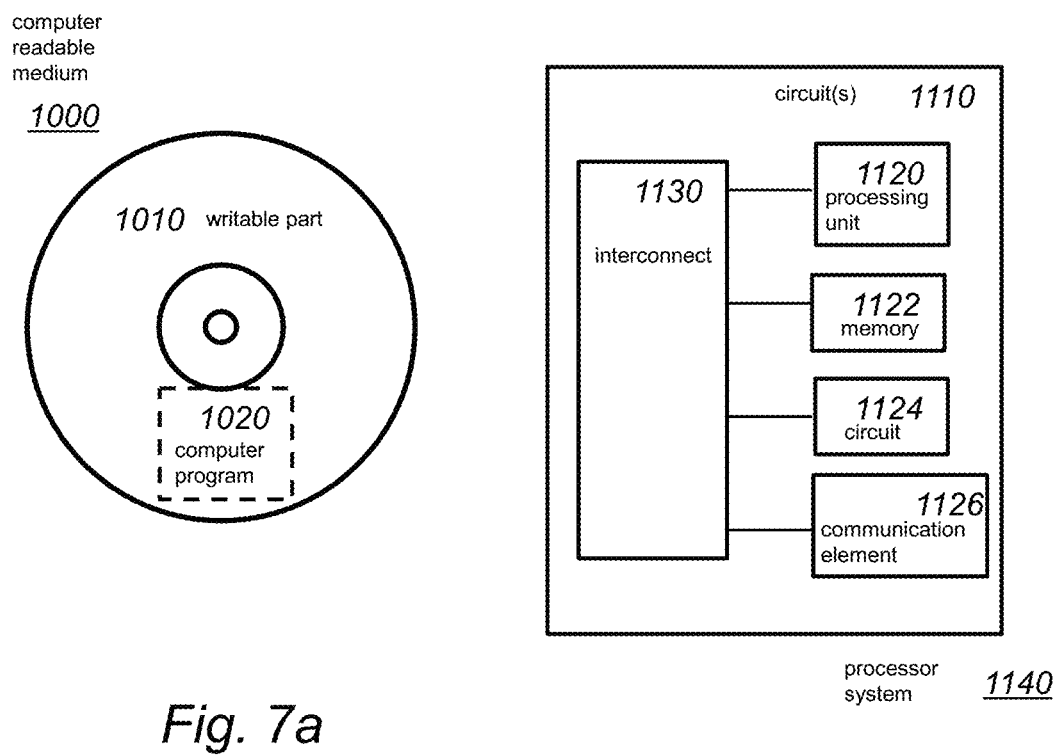

FIG. 7a shows a computer readable medium 1000 having a writable part 1010 comprising a computer program 1020, the computer program 1020 comprising instructions for causing a processor system to perform a blockchain transaction method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said blockchain transaction method.

FIG. 7b shows in a schematic representation of a processor system 1140 according to an embodiment of a blockchain transaction device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the blockchain transaction device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A blockchain transaction device comprised in a mobile phone arranged to generate a transaction for a blockchain, the blockchain transaction device comprising:
   an electronic memory system comprising a first electronic memory and a second electronic memory, the first and second memory being physically different memories, the electronic memory system further comprising:
   a high security data area being part of the first memory and a low security data area being part of the second memory, the high security data area comprising data determining a private key of a public key and private key pair, and
   a cryptographic kernel application and a transaction application, the cryptographic kernel application having access to the high security data area, the transaction application having access to the low security data area,
   a processor circuit system comprising a first processor circuit and a second processor circuit, the first processor circuit being configured to execute the cryptographic kernel application, and the second processor circuit being configured to execute the transaction application, wherein the first memory and the first processor circuit are comprised in a Subscriber Identity Module (SIM), and wherein
   the transaction application is configured to generate a transaction, said transaction comprising a signature, the transaction application being configured to call a signing interface of the cryptographic kernel application to obtain the signature,
   the cryptographic kernel application comprises the signing interface and is configured to access the high security data area and compute the signature from the private key, and
   a communication interface arranged to transmit the transaction for inclusion in the blockchain,
   wherein a security domain is coupled to the transaction application and the cryptographic kernel application, the security domain linking the cryptographic kernel application having access to the high security data area in the SIM and the transaction application having access to the low security data area to each other.

2. A blockchain transaction device as in claim 1, wherein the data determining the private key is a private key and/or a seed for deriving the private key.

3. A blockchain transaction device as in claim 1, wherein the cryptographic kernel application comprises a key generation interface, the cryptographic kernel application being configured to
   generate the public key and private key pair, and
   export the public key to the transaction application and/or export a key identifier of the public key to the transaction application.

4. A blockchain transaction device as in claim 1, wherein the cryptographic kernel application comprises a key storing interface, the cryptographic kernel application being configured to
   receive data determining a private key of a public key and private key pair, and
   store data determining the private key in the high security data area.

5. A blockchain transaction device as in claim 1, wherein the high security data area is arranged to store multiple data determining the private keys, the multiple private keys being indexed with a corresponding key identifier, wherein the key identifier of the private key is obtained by computing a hash over the public key corresponding to the private key.

6. A blockchain transaction device as in claim 1, wherein the high security data area is arranged to store multiple data determining private keys, the multiple private keys being indexed with a corresponding key index, wherein the low security data part comprises a mapping between a key identifier of a private key and the key index.

7. A blockchain transaction device as in claim 1, wherein the data determining the private key stored in the high security data area is a seed, the cryptographic kernel application being configured to compute the private key from the seed if the private key is needed.

8. A blockchain transaction device as in claim 7, wherein the cryptographic kernel application is configured to compute the private key from the seed and derivation information, the derivation information being stored in the low security data area.

9. A blockchain transaction device as in claim 1, wherein the transaction application is configured to collect entropy from the blockchain transaction device, and make the collected entropy available to the cryptography kernel application.

10. A blockchain transaction device as in claim 1, wherein the cryptographic kernel application is configured to obtain signing data from the signing interface, and to display information obtained from the signing data on a display of the blockchain transaction device before signing the signing data.

11. A blockchain transaction device as in claim 1, wherein the cryptographic kernel application is configured to obtain a fingerprint of the blockchain transaction device, and to refuse the signing interface access to the high security data area if the obtained fingerprint does not agree to a previously stored fingerprint.

12. A blockchain transaction method for a blockchain transaction device comprised in a mobile phone, wherein the blockchain transaction device comprises a first memory, a second memory, a processor system comprising a first processor circuit configured to execute a cryptographic kernel application having access to a high security data area being part of the first memory; and a second processor circuit configured to execute a transaction application having access to a low security data area being part of the second memory, wherein the first and second memory are physically different memories, and the first memory and the first processor circuit are comprised in a Subscriber Identity Module (SIM), the blockchain transaction method arranged to generate a transaction for a blockchain, the blockchain transaction method comprising:
   coupling a security domain to the transaction application and the cryptographic kernel application, the security domain linking the cryptographic kernel application having access to the high security data area in the SIM and the transaction application having access to the low security data area to each other,
   providing data determining a private key of a public key and private key in the high security data area,
   generate a transaction in a transaction application, said transaction comprising a signature,
   calling a signing interface of the cryptographic kernel application to obtain the signature for including in the transaction,
   accessing the high security data area and computing the signature from the private key, by the cryptographic kernel application comprising the signing interface, and
   transmitting the transaction for inclusion in the blockchain.

13. A computer readable medium comprising non-transitory data representing instructions to cause a processor system to perform a blockchain transaction method for a blockchain transaction device comprised in a mobile phone, wherein the blockchain transaction device comprises a first memory, a second memory, a processor system comprising a first processor circuit configured to execute a cryptographic kernel application having access to a high security data area being part of the first memory; and a second processor circuit configured to execute a transaction application having access to a low security data area being part of the second memory, wherein the first and second memory are physically different memories, and the first memory and the first processor circuit are comprised in a Subscriber Identity Module (SIM), the blockchain transaction method arranged to generate a transaction for a blockchain, the blockchain transaction method comprising:

coupling a security domain to the transaction application and the cryptographic kernel application, the security domain linking the cryptographic kernel application having access to the high security data area in the SIM and the transaction application having access to the low security data area to each other, providing data determining a private key of a public key and private key in the high security data area, generate a transaction in a transaction application, said transaction comprising a signature, calling a signing interface of the cryptographic kernel application to obtain the signature for including in the transaction, accessing the high security data area and computing the signature from the private key, by the cryptographic kernel application comprising the signing interface, and transmitting the transaction for inclusion in the blockchain.

* * * * *